US012786752B2

(12) United States Patent
Terry et al.

(10) Patent No.: US 12,786,752 B2

(45) Date of Patent: Nov. 3, 2026

(54) AUTO-PROVISIONING AND COMMISSIONING

(71) Applicant: Kymeta Corporation, Redmond, WA (US)

(72) Inventors: Troy Terry, Redmond, WA (US); Christian Miller, Redmond, WA (US); Paul Klassen, Newcastle, WA (US)

(73) Assignee: Kymeta Corporation, Redmond, WA (US)

( * ) Notice: Subject to any disclaimer, the term of this patent is extended or adjusted under 35 U.S.C. 154(b) by 302 days.

(21) Appl. No.: 18/770,324

(22) Filed: Jul. 11, 2024

(65) Prior Publication Data

US 2024/0373256 A1 Nov. 7, 2024

Related U.S. Application Data

(62) Division of application No. 17/133,019, filed on Dec. 23, 2020, now Pat. No. 12,063,527.

(60) Provisional application No. 62/954,915, filed on Dec. 30, 2019.

(51) Int. Cl.

*H04W 24/02* (2009.01)

*H04W 24/08* (2009.01)

(52) U.S. Cl.

CPC ........... *H04W 24/02* (2013.01); *H04W 24/08* (2013.01)

(58) Field of Classification Search

CPC .............................. H04W 24/02; H04W 24/08

See application file for complete search history.

(56) References Cited

U.S. PATENT DOCUMENTS 6,266,024 B1 7/2001 Ramanujam et al.
10,638,417 B1 * 4/2020 Baki .................... H04W 48/16
2002/0057091 A1 5/2002 Hensler et al.

(Continued)

FOREIGN PATENT DOCUMENTS

WO 2018/017429 A1 1/2018
WO 2019/036727 A1 2/2019

OTHER PUBLICATIONS

Office Action received for IL Patent Application No. 294374, mailed on Apr. 21, 2026, 3 pages.

(Continued)

*Primary Examiner* — Nguyen T Vo

(74) *Attorney, Agent, or Firm* — Womble Bond Dickinson (US) LLP

(57) ABSTRACT

System and methods are disclosed for automatically provisioning and commissioning an electronic device ("device"), such as a satellite modem coupled to a reconfigurable satellite antenna. The device is provisioned at a first location, e.g., at a manufacturing facility, using first provisioning data and first commissioning data that is sufficient for the device to establish a communication link with a network and a server having an activated user account. The first provisioning data and first commissioning data is based at least in part upon machine learning over a plurality of devices of a similar type. The device is then set-up and powered-on at a second location, e.g., an end-use location. The device connects to the network, logs in to the user account, and provides a serial number and the second location to the server. The server downloads second provisioning data this based at least in part upon the second location to the device.

20 Claims, 7 Drawing Sheets

(56) References Cited

U.S. PATENT DOCUMENTS

| | | | | |
|---|---|---|---|---|
| 2015/0256391 | A1* | 9/2015 | Hardy | H04L 41/5054 709/222 |
| 2016/0029224 | A1* | 1/2016 | Edge | H04W 24/08 455/456.1 |
| 2016/0105314 | A1 | 4/2016 | Logue | |
| 2018/0176080 | A1 | 6/2018 | Marsh | |
| 2019/0310836 | A1 | 10/2019 | Reichl | |
| 2020/0028900 | A1* | 1/2020 | Rice | H04W 4/02 |

OTHER PUBLICATIONS

Office Action received for Israel Patent Application No. 294374, mailed on Dec. 3, 2024, 4 pages.
Chen, Q., et al., "Adaptive Tracking for Beam Alignment between Ship-Borne Digital Phased-Array Antenna and LEO Satellite", Journal Of Communications And Information Networks, [Online], vol. 4, No. 3, Sep. 1, 2019, pp. 60-70.
International Preliminary Report on Patentability received for PCT Patent Application No. PCT/US20/67181, mailed on Jul. 14, 2022, 6 pages.
International Search Report and Written Opinion received for PCT Patent Application No. PCT/US20/67181, mailed on Apr. 19, 2021, 9 pages.
Miura, R. et al., "Beamforming Experiment with a DBF Multibeam Antenna in a Mobile Satellite Environment", IEEE Transactions on Antennas and Propagation, vol. 45, Issue: 4, Apr. 1, 1997, pp. 707-714.
Notice of Allowance received for U.S. Appl. No. 17/133,019, mailed on Apr. 24, 2024, 10 pages.
Supplementary European Search Report and Search Opinion received for European Application No. 20910553.5, mailed on Jan. 30, 2024, 9 pages.

* cited by examiner

AUTO-PROVISIONING AND COMMISSIONING

RELATED APPLICATIONS

This application is a divisional of U.S. Non-Provisional patent application Ser. No. 17/133,019, entitled "Auto-Provisioning and Commissioning", to Troy Terry, et al., filed Dec. 23, 2020, which claims priority of U.S. Provisional Patent Application Ser. No. 62/954,915, entitled "AUTO-PROVISIONING AND COMMISSIONING," to Troy Terry et al., filed Dec. 30, 2019, which are both hereby incorporated by reference in their entirety to the extent that they are consistent with this patent application.

This application is further related to U.S. Provisional Patent Application Ser. No. 62/618,490, entitled "METHOD TO IMPROVE PERFORMANCE, MANUFACTURING, AND DESIGN OF A SATELLITE ANTENNA," to Paul Klassen, et al., filed Jan. 17, 2018, and U.S. patent application Ser. No. 16/249,839, entitled "METHOD TO IMPROVE PERFORMANCE, MANUFACTURING, AND DESIGN OF A SATELLITE ANTENNA," to Paul Klassen, et al., filed Jan. 16, 2019.

TECHNICAL FIELD

Embodiments of the present disclosure relate generally to improving deployment of manufactured electronic devices, including reconfigurable holographic satellite antennas, through automatic provisioning and commissioning of the products.

BACKGROUND

Some manufactured electronic devices have very high complexity. In the prior art, bringing such devices into operation requires assistance from a skilled technician to perform provisioning of the device, such as downloading data onto the device that is appropriate for a particular device or a particular user's installation, or making modifications to configuration of the device for a particular user's application or installation.

In the prior art, provisioning and commissioning requires manual, in-person technical support or technical support via existing communications facilities. Manual provisioning and commissioning are problematic for device installations that are specifically intended to provide communications services in a remote location that may not already have reliable communications services with which to contact technical support to accomplish provisioning and commissioning of the communications device at the remote location where the device is intended to be used to provide reliable communications. In such case, in the prior art, provisioning and commissioning the device may need to be performed at some location where there is reliable communication so that a technician can remotely provision and commission the device. Otherwise, a technician may need to be dispatched to the remote location to provide provisioning and commissioning, in person.

Further, provisioning and commissioning of electronic communication devices in some locations may require location-specific provisioning and/or commissioning, such that provisioning and commissioning of the device at a first location, such as a manufacturing facility of the device, may not be optimal or appropriate for using the device in a second location, such as a final location of intended use of the device. At manufacturing time, it is generally not known where at particular device will be used. Thus, it is either difficult or impossible to accomplish to pre-provision a particular device for an unknown location of intended use for the device.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
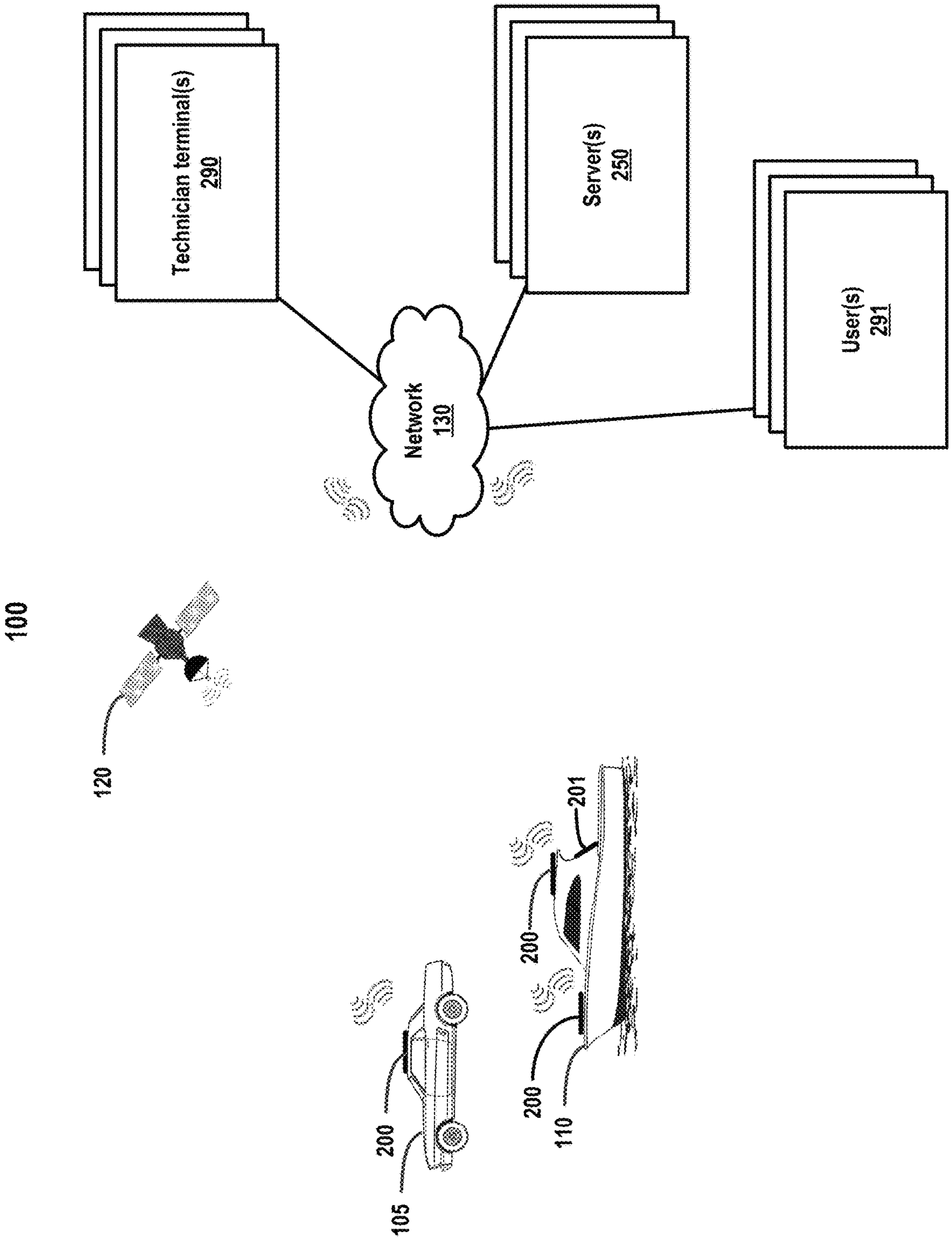
FIG. 1 is a block diagram illustrating a satellite-based network for automatically provisioning and commissioning an electronic device, according to one embodiment of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

System and methods are disclosed for automatically provisioning and commissioning an electronic device ("device"), such as a reconfigurable holographic satellite antenna with a satellite modem and antenna subsystem module. The device is provisioned at a first location, e.g., at a manufacturing facility, using first provisioning data, without knowing a final hardware configuration for the device. The first provisioning data and first commissioning data are based at least in part upon machine learning over a plurality of devices of a similar type as the electronic device being provisioned. The first provisioning and first commissioning data are sufficient for the device to establish a communication link with a network and a server having an activated user account. The device is then assembled and powered-on at a second location, e.g., an end-use location. The device connects to the network, logs in to the user account, and provides a serial number and the second location to the server. The server downloads second provisioning data this based at least in part upon the second location to the device.

In one embodiment, a computer-implemented method of establishing communication using an electronic device is disclosed. During a manufacturing process of the electronic device at a first location: the electronic device receives first provisioning information and first commissioning information having values that are predetermined for a plurality of different electronic devices. The first provisioning and commissioning information is sufficient for the electronic device to establish a communication link with a network of the type for which the electronic device was designed. In an embodiment, first commissioning information can include results of one or more of: a pointing and tracking test, a cross-polarization discrimination (XPD) test, a beam side load level (SLL), an instantaneous bandwidth (IBW) test, or a P1dB test. In an embodiment, the electronic device can be a satellite modem coupled to a reconfigurable holographic satellite antenna having an antenna subsystem module (ASM). During a power on process of the electronic device at a second location, different from the first location, the electronic device establishes a communications link with a network and logs in to a user account at a server. In an embodiment, the electronic device provides a serial number of the electronic device to the server. In an embodiment, the electronic device provides the second location to the server. The second location can be, for example, a textual representation of a location, "e.g., Majorca, Spain," or global positioning system (GPS) coordinates, latitude and longitude pair, or a triangulation of cellular towers. In an embodiment, the server obtained the second location from the user at the time of activating the user account. In an embodiment, the user account can be associated with a plurality of second locations (e.g., end-use locations). The electronic device then receives second provisioning information that is particular to one or more aspects of the electronic device. The one or more aspects of the electronic device can include a particular hardware configuration of the electronic device, such as a specific block up-converter (BUC) power level, a specific low-noise block down-converter (LNB) power level, or a modified beam map that accounts for the second location (e.g., end-use location) of the electronic device. The beam map can be a listing of available carrier frequencies at the second location. After receiving and installing the second provisioning information, the electronic device can reboot to activate the second provisioning information, and establish a communication link using at least the second provisioning information.

In an embodiment, a server is disclosed that is configured to provide, to an electronic device that is located at a second (e.g., end-use) location, second provisioning information. The electronic device was previously provided with first provisioning information and first commissioning information when the electronic device was located at a first location (e.g., manufacturing location). The server includes at least a network interface, at least one hardware processor, and a memory coupled to the processor that stores executable instructions, that when executed by the processor, cause the processor to perform operations for providing the second provisioning information to the electronic device at the second location. The operations can include receiving, from the electronic device, login information to a user account on the server, and the server downloading, to the electronic device, second provisioning information that takes into account at least the second location, and model, of the electronic device. The server can receive, from the electronic device, an indication of successful installation of the second provisioning information. In an embodiment, the operations can further include receiving, from the electronic device, a serial number of the electronic device and an indication of a geo-location of the second location. Using the serial number of the electronic device, the server can retrieve a model number of the electronic device, and can retrieve the second provisioning information that is based at least in part upon the model number and second location. In an embodiment, the operations can also include, after the electronic device has downloaded and installed the second provisioning information, the server instructing the electronic device to perform one or more commission tests that generate second commissioning information. The server can then store the second commissioning information in association with the serial number of the electronic device.

In an embodiment, any of the above method operations can be performed by a processing system having at least one hardware processor, and a memory programmed with executable instructions that, when executed by the processing system, perform the operations of the methods.

In an embodiment, any of the above method operations can be implemented with executable instructions programmed onto a non-transitory computer readable medium, such as a memory or storage. When the executable instructions are executed by a processing system having at least one hardware processor, the processing system causes the method operations to be performed.

FIG. 1 is a block diagram illustrating a satellite-based network 100 for automatically provisioning and commissioning an electronic device, according to one embodiment of the disclosure. FIG. 1 is discussed with reference to provisioning an electronic device that includes a satellite modem coupled to a reconfigurable holographic satellite antenna. Concepts described herein can be applied to different types of electronic devices, for use on different types of networks, that are manufactured with an assumed, standard, or average, set of provisioning data and results of initial commissioning tests for a general type of similar electronic devices (e.g., satellite modem, cable modem, cellular transceiver, or WiFi modem) sufficient to allow the electronic device to connect to a server across a network of a type for which the electronic device is designed. When the electronic device is later installed at a second location, e.g., a location of end-use, then the electronic communication device is powered on, connects to a network and a server, and can be provisioned with second provisioning information that is specific to a particular model of the electronic device, and can also be particular to the second location at which the electronic device is installed.

In an embodiment, second provisioning information can include adjusting transmit power for an uplink and/or downlink. An average transmit power for a type of satellite modems may be 8 watts (8 W) of power for a block up-converter (BUC). This power level may sufficient for a plurality of satellite modems of a similar type. However, for a particular model, or for a particular installation or location, a 16 W block up-converter may have better performance. A low-noise block down-converter (LNB) may be similarly adjusted with second provisioning information when the satellite modem is powered on at its second location (e.g., end-use location). A satellite modem may have first provisioning information that lists all available carrier beams that are known for all known satellites, so that the device can find a carrier signal anywhere in the world. Second provisioning information can also include tailoring a beam map of available carriers to a beam map that is appropriate for the second location at which the electronic device is installed. Tailoring the beam map to contain beams that are available where the satellite modem will be used can increase the efficiency of searching for an available carrier to use, rather than searching all carriers in the beam full list of all available carriers. In a cellular network embodiment, first provisioning information can include, e.g., all carrier frequencies for one or more standards, e.g. 2G, 3G, 4G LTE, and 5G new radio (NR), for all carrier companies, e.g., AT&T, T-Mobile, U.S. Cellular, etc., for a particular country, e.g., the United States. Second provisioning information can narrow the carrier frequency list to, e.g., a particular carrier company, one or more specific countries, and one or more standards.

By having first, general or average, provisioning information for a class of a similar type of electronic devices, a manufacturer need not maintain complete separate provisioning files for each model of electronic device. The second provisioning information can capture specific provisioning details for a particular model of electronic device, and/or specific provisioning details for a particular end-use location of the electronic device. The first provisioning information is sufficient to allow the electronic device to connect to a network and connect to a server to obtain second provisioning information that may be optimal for the particular model and location of the electronic device.

The following description of FIG. 1 is made with reference to a satellite modem embodiment in a satellite network. The description is made by way of example, and not limitation.

A satellite-based network 100 can include, e.g., one or more reconfigurable holographic antennas each having an antenna subsystem module (hereafter, "steerable antenna (ASM))" 200. A steerable antenna 200 is an electronic device capable of bi-directional communication with a satellite 120. The steerable antenna 200 can be installed on a vehicle, such as a car 105 or boat 110, or other mobile installation. A steerable antenna 200 can also be installed in a fixed location, such as on a building, in place of, or in addition to, a land-based communication system.

An installation can have one or more steerable antennas 200, as shown on boat 110. Multiple steerable antennas 200 in a single installation can improve signal performance based upon location of the steerable antenna 200 in the installation, such as different locations having different visibility to one or more satellites. The multiple steerable antennas 200 can be interconnected using a combiner 201, as shown on boat 110. In an embodiment, combiner 201 can initiate bi-directional communication with satellite 120 through one or more connected antennas 200. In an embodiment, combiner 201 can select one or more of the steerable antennas 200 connected to combiner 201 to initiate communication with satellite 120.

The satellite-based network 100 can also include one or more servers 250 that can serve updates of software, configuration information, provisioning information, and one or more commissioning tests for a steerable antenna 200 to run, and other information to manage steerable antennas 200 in the satellite-based network 100. The steerable antenna can include a satellite modem, which is to be provisioned as described herein. A reference to the steerable antenna 200 is intended to mean a reference to the satellite modem contained therein, unless stated otherwise. Thus, provisioning a satellite modem or provisioning the steerable antenna can be used interchangeably, unless otherwise stated. Both the satellite modem and satellite steerable antenna are considered "electronic devices" within the meaning used herein, unless otherwise stated. Server(s) 250 can also store information regarding each steerable antenna 200 in the satellite-based network 100, in association with a unique identifier of each steerable antenna 200. The unique identifier can be a serial number of the steerable antenna, an IP address, or a combination of serial numbers of components that make up the steerable antenna. Server(s) 250 can store first provisioning and first commissioning information for one or more types of similar steerable antennas 200 (electronic devices). Server(s) 250 can further store second provisioning information for specific models of a steerable antenna and for particular end-use locations of the steerable antennas. Server(s) can further store commissioning tests that may be downloaded and executed by a steerable antenna 200. Server(s) 250 can include a machine learning system that trains one or more models for provisioning electronic devices, utilizing manufacturing testing data and historic information of updates and software, configuration parameters, and other provisioning information of on one or more manufactured and/or deployed steerable antennas 200. Server(s) 250 can store detailed information of the entire life-cycle of deployed steerable antennas.

The satellite-based network 100 can also include one or more technician terminal(s) 290 that can interact with servers 250. Technician terminals 290 can be used to initiate automatic an automated process for provisioning and commissioning the steerable antenna, e.g., installation of first provisioning information and first commissioning information. Technician terminals 290 can also be used by service technicians, as may be needed to assist in diagnosing and resolving field installation issues, or in assisting an end-user in creating a user account, selecting subscription services, and the like. As a steerable antenna is manufactured, the antenna is put through a series of manufacturing tests and performance ("commissioning") tests to ensure conformance of components of the antenna, and the finished antenna, to performance specifications. Such commissioning tests can include a steering and pointing test, a cross-polarization discrimination (XPD) test, a side lobe level (SLL) test, a P1dB test, and a test to determine maximum power of the steerable antenna 200.

Data collected, both as inputs and outputs, to test processes can be stored in server(s) 250 in association with a unique serial number of each steerable antenna 200 or combiner 201. Servers 250 can be any kind of servers or a cluster of servers, such as Web or cloud servers, application servers, backend servers, or a combination thereof. Components of a server 250 can be as described below with reference to FIG. 7. Servers 250 can include data analytics servers that can perform machine learning on data retrieved from steerable antennas 200 to determine the existence of problems, based upon correlation of collected. The solutions can be used to improve performance for one or more steerable antennas 200, such as with a new software update, patch, hot fix, configuration, algorithm, or tunable parameter of one or more steerable antennas 200.

Network 130 may be any type of network such as a local area network (LAN), a wide area network (WAN) such as the Internet, a cellular network, a satellite network, or a combination thereof, wired or wireless.

Satellite-based network 100 can further include one or more technician terminals 290. Components of a technician terminal 290 can be as described below with reference to FIG. 7. Technician terminal(s) 290 may include specialty hardware and interfaces for coupling to special-purpose testing equipment or connections on the steerable antenna. Technician terminal(s) 290 can be used to initiate one or more manufacturing tests that produce test data for a particular steerable antenna 200 under test. Such test data can be copied to a machine learning server 250 for the purpose of determining configuration parameters and other values for first, and/or second provisioning information. Technician terminal(s) 290 may also be used to initiate one or more commissioning tests for the steerable antenna 200, or its subsystems, under test. Test data generated by commissioning tests may be similarly be transmitted to machine learning server(s) 250 for the purpose of determining machine-learned commissioning results that result from the commissioning test data.

Satellite-based network 100 can further include a plurality of user terminal(s) 291. User terminal 291 refers to any type of electronic device that may be used by a user to access one or more servers 250 for the purpose of activating a user account on a subscription server, interacting with a service technician, or other user-oriented interactions related to a manufacturer of a device, with activation of the device, and with servicing or maintenance of the device.

A user account, for purposes described herein, relates a particular user to subscription services of the user, billing information, and a serial number and one or more end-use locations of a particular steerable antenna 200. A user account may also be associated with one or more steerable antennas 200 each of which has a serial number and one or more end-use locations. A serial number and/or end-use location of a particular steerable antenna 200 may be associated with the user account at the time of activation of the user account. In an embodiment, the serial number and/or one or more end-use locations of the particular steerable antenna may be associated with the user account at the time of first powering on the steerable antenna at its intended use location. In an embodiment, the steerable antenna has its own serial number stored within its memory. The steerable antenna can also determine its own geo-location at the time of powering on the antenna. The serial number and geo-location of the steerable antenna can be transmitted by the steerable antenna to the user account at the time of the steerable antenna's first power on.

Hardware for a user terminal 291 can be as described below with reference to FIG. 7. Generally, user terminal 291 can be any well-known user equipment (cell phone, laptop, desktop, tablet, etc.) that can connect to network 130 and access server 250.

Figure 2A:
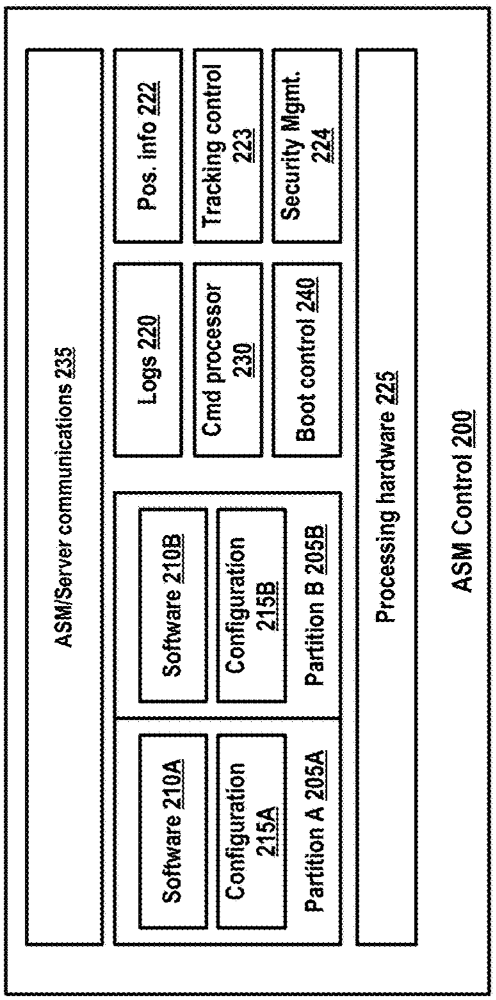
FIG. 2A is a block diagram illustrating components of an electronic device that can be automatically provisioned and commissioned, according to one embodiment.

FIG. 2A is a block diagram illustrating components of an antenna subsystem module (ASM) 200 of a steerable antenna, having a satellite modem that can be automatically provisioned and commissioned, according to one embodiment. In the description below, reference 200 will be used to refer to both the ASM, including satellite modem, and the steerable antenna (reconfigurable holographic antenna), interchangeably, unless a distinction is required for clarity.

ASM 200 can include at least two storage partitions: partition A 205A and partition B 205B. ASM 200 can also include processing hardware 225, log files 220, position information module 222, tracking control module 223, security management 224, command processing logic (or, command processor) 230, ASM/Server communications 235, and boot control 240.

Processing hardware 225 can include one or more hardware processors interconnected with memory, storage, one or more timers, and communications hardware via a bus. Exemplary processing hardware is described below with reference to FIG. 7. Storage can include two or more storage partitions, partition A 205A and partition 205B. Each of the partitions can include operating software, e.g., software 210A for partition 205A, and configuration information, e.g., configuration 215A for partition 205A. In an embodiment, when ASM 200 is at a first location (e.g., manufacturing facility), configuration 215A for partition 205A can store first provisioning information and first commissioning information. In an embodiment, when ASM 200 is powered on at a second location (e.g., end-use location), configuration 215B for partition 205B can include at least second provisioning information. Partition B can also include one or more portions of first provisioning and first commissioning information. When the ASM 200 boots, boot control 240 can control which partition, 205A or 205B, that the ASM 200 boots to.

For example, software 210A in partition 205A may be an older version of software than 210B in partition 205B. Software 210B can be, e.g., an update that was just installed into partition B. After completion of the installation of updated software 210B, boot control 240 can reboot the ASM 200 to partition 205B to use software 210B. If software 210B fails to boot a predetermined number of times, then boot control 240 can reboot again to partition 205A to use software 210A.

Similarly, configuration information 215A in partition 205A may include first provisioning and first commissioning information, which is more general than the configuration partition 215B. Configuration information 215B can include second provisioning information that is specific to a particular model of ASM 200 and can also be tailored for second location (e.g., end-use location). After completion of the download and installation of second provisioning information at the second location (end-use location) into configuration information 215B, boot control 240 can reboot the ASM 200 to partition 205B to use configuration information 215B. During rebooting to partition 205B, a power-on self-test (POST) can be performed and logs can be generated indicating start-up performance of the ASM 200 using the updated configuration information 215B. In addition, one or more performance monitors in software 210B can be used to determine whether the updated configuration information 215B yields improved performance over configuration information 215A. If performance is not improved, boot control 240 can reboot to the previous partition 205A to use the previous configuration information 215A.

In an embodiment, updating the configuration information, e.g., 215A, can be performed in the same partition, e.g., 205A so that rebooting to a different partition is not needed to activate the updated configuration information. Thus, one partition can hold multiple copies of configuration information. Boot control 240 can store a reference to the currently active partition and currently active configuration such that boot control 240 can "hot-swap" between multiple versions of the configuration in a partition to compare performance of each copy of configuration information.

ASM control 200 can further include a command processor 230. Command processor 230 can receive a package of information from server 250. Command processor can decrypt the received package and verify that the package was successfully downloaded by computing a checksum of the decrypted package and comparing the checksum with a stored checksum in the package. Encryption of the package can be by symmetric key or asymmetric key encryption. In an embodiment using asymmetric key encryption, such as public key infrastructure (PKI), the package is encrypted by server 250 using a public key of the ASM 200, and then transmitted to the ASM 200. The ASM 200 decrypts the package using private key of the ASM 200. In an embodiment, each package transmitted by the server 250 and received by the ASM 200 may include a digital signature of the server 250 that is verifiable by the ASM 200 and/or a security certificate of the server 250, verifiable by a third-party certificate service. In an embodiment, each package received by the server 250, from the ASM 200, can be digitally signed with a public key of the server 250. The server 250 can use a private key of the server 250 to decrypt the signature and verify the identity of the ASM 200 sending the package. Packages received from ASM 200 can also be signed by the ASM 200 using a private key of the ASM 200, and decrypted by server 250 to verify the identity of ASM 200.

Command processor 230 can parse the received, decrypted and verified package from the server 250 to extract one or more commands from the server for the ASM 200 to perform, and to extract associated parameters, values, or other data from the package. Commands can include, but are not limited to, a command informing the ASM 200 that a software update is available, a command informing the ASM 200 that one or more updated parameters that may improve ASM 200 performance are available, a command instructing the ASM 200 to reset one or more parameters of the ASM 200 that were altered by manual optimization by the user, a command to set, or clear, a variable indicating that the ASM 200 should request an update to software, and a command to enter a debug mode, log output of the debug mode, and transmit the debug log(s) to the server 250. Logs 220 can include the debug logs. Logs 220 can also include logging of information during regular operation of the ASM 200, including environmental temperature and humidity of an area surrounding the ASM, temperature of one or more segments of the steerable antenna, power-on self-test information, partition information, such as which partition is the currently active partition, the software version in the currently active partition, file sizes in the partitions, serial number of the steerable antenna, control variables of different operating processes of the steerable antenna and antenna subsystem module, quality metrics of antenna performance, and other data. Position information module 222 can manage information regarding location tracking of the ASM 200 and reconfigurable holographic antenna with respect to, e.g., a GPS satellite, to assist in beam steering. Tracking control module 223 can track one or more satellites with which the reconfigurable holographic antenna 200 may communicate. Tracking control module 223 can cooperate with position information module 222 to provide information for beam steering by the reconfigurable holographic antenna. Security management module 224 can assist ASM/Service communications 235 to setup and maintain secure communication channels. Security management module 224 can also implement security over portions of memory, login credentials, and implementation of encrypted and signed data transfer.

ASM 200 can further include an ASM-to-Server (ASM/Server) communication module 235. ASM/Server communications 235 can initiate a Mutual Transport Layer Security (MTLS) connection between the ASM 200 and server 250. The connection is secured using asymmetric key cryptography to encrypt data transmitted using keys that are mutually authorized by both the ASM 200 and server 250. The identity of the communicating parties (ASM 200 and server 250) can be optionally authenticated using public-key infrastructure (asymmetric key) cryptography.

ASM/Server communications can include satellite communications hardware and logic, Ethernet communications hardware and logic, cellular communications hardware and logic, or other form of communication medium, such that at least first provisioning and first commissioning of the electronic device can be performed using either terrestrial or satellite communications. In practice, for an ASM 200, second provisioning would typically be via satellite communication in circumstances wherein satellite communication is preferable, or is the only available communication medium.

Figure 2B:
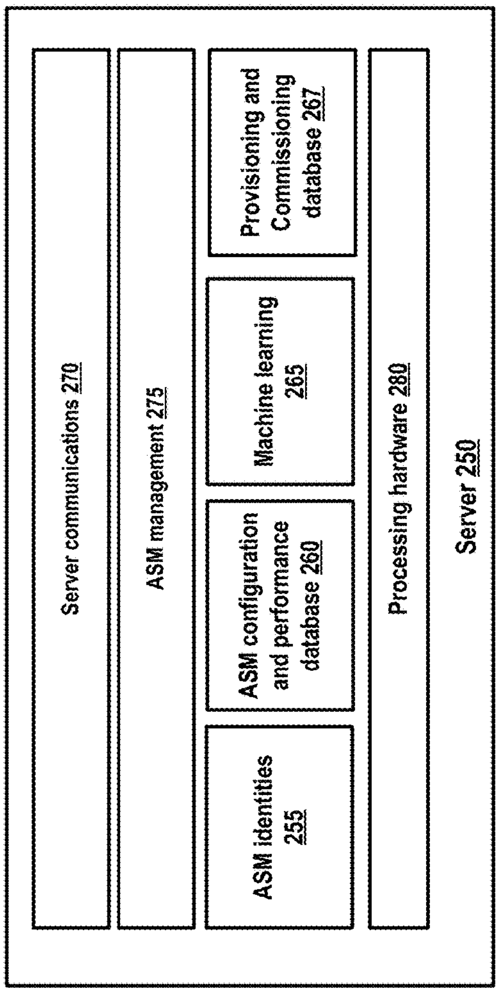
FIG. 2B is a block diagram illustrating components of a server that can automatically provision and commission an electronic device, according to one embodiment.

FIG. 2B is a block diagram illustrating components of a server, e.g., server 250, that can automatically provision and commission an electronic device, according to one embodiment.

Server(s) 250 can perform multiple functions, including setting up and activating user accounts, receiving and storing manufacturing and commissioning test results, and performing machine learning on the manufacturing and commissioning results to generate first provisioning and first commissioning information, and to generate second provisioning information. Server(s) can store first provisioning information, first commissioning information, and second provisioning information in a database 267 in storage of one or more server(s) 250.

Provisioning the electronic device ("device") can comprise downloading, and installing, by the device, a plurality of configuration files that configure the operation of the device. A first provisioning of the electronic device can occur at a first location. The first location can be, but is not limited to, a manufacturing and/or testing facility associated with the device. The first provisioning information can include a plurality of configuration files that configure the operation of the device. First provisioning data can be based upon average values obtained, at least in part, by machine learning over a plurality of electronic devices of a same type. A same type can refer to a same, or similar, model of electronic device. In an embodiment, the same, or similar, model of electronic device can be made by a same manufacturer. In an embodiment, the first provisioning data can be obtained during manufacturing and testing of new, or refurbished, electronic devices. The following four types of provisioning data are exemplary for a satellite modem coupled to a reconfigurable holographic satellite antenna ("electronic device").

Different types of provisioning data can be provided for differing types of electronic devices. Provisioning data may be in any format, including text, JavaScript Object Notation (JSON), binary, or a proprietary format. One skilled in the art understands that the following provisioning data may be provided as a single file having multiple sections for the data described below. Alternatively, the first provisioning data can be provided in one or more files. The following description of provisioning information is described with reference to an electronic device which is a satellite modem coupled to a reconfigurable holographic satellite antenna and antenna subsystem module. Provisioning information, and commissioning tests are further disclosed in related U.S. patent application Ser. No. 16/249,839, entitled "METHOD TO IMPROVE PERFORMANCE, MANUFACTURING, AND DESIGN OF A SATELLITE ANTENNA," to Paul Klassen, et al., filed Jan. 16, 2019. See, at least, "Free Space Test," FIGS. 5A and 5B; "Feed Test," FIG. 6; "Functional Verification Test;" "Antenna Optimization/Characterization," which includes a steering and pointing test and cross-polarization discrimination (XPD) test, see FIG. 7; and machine learning on selected data, see FIGS. 9, 10A-10C, and their related description within the Specification.

In an embodiment for a satellite modem coupled to a steerable reconfigurable holographic antenna with an antenna subsystem module ("electronic device"), provisioning database 267 can include first provisioning information having a listing of carriers on a network that the electronic device can be configured to use for communication. The network can include one or more global satellite networks, including, e.g., low earth orbit (LEO) networks, medium earth orbit (MEO) networks, geosynchronous equatorial (GEO) and geostationary (GSO) satellite networks. In such an embodiment, the listing of carriers can describe different carriers that are available to the electronic device at different geo-locations that correspond to coverage areas of one or more satellites. In an embodiment, the first provisioning data can also include data that is used to configure the electronic device to use a carrier as both a signaling carrier and a data carrier.

In operation, after the electronic device is configured with the first provisioning data, the electronic device can select a carrier to use for signaling and/or data. The electronic device can configure itself to receive satellite transmission at the selected carrier frequency. If no satellite transmission is received within a predetermined period of time, then the electronic device can configure itself to receive transmission on a next selected carrier in the listing of carriers, until the electronic device finds a suitable carrier on which to receive satellite transmissions. At the time of manufacturing, a final location that an end-user will put the electronic device into service is usually unknown. Thus, in an embodiment, the first provisioning data may contain a list of all known carriers in all geo-locations in which the electronic device may be used. By default, the list can be all known carriers for all known satellites.

A first provisioning information file can be termed a "Constellation" file. The Constellation file includes details on all signaling carriers of a global network. Depending on the configuration of the electronic device, the electronic device may not use this file and only try to use data carriers that it already knows about. A carrier can be configured to simultaneously act as a signaling carrier and a data carrier. In an embodiment, at least one carrier is configured to be used as a signaling carrier and at least one different carrier is configured to be used as a data carrier. Signaling carriers provide electronic devices with information about the network and all possible data carriers that it can use (also termed a "beam map"). Signaling carriers tend to not change over time, while data carriers can change more often. By keeping the signaling carriers relatively constant, the electronic device has a reliable way of discovering the network.

Provisioning database 267 can further include a second provisioning file for the electronic device, having a certificate for accessing the network. The certificate can be a binary file with the certification of the network. The certification adds security to the network so that only electronic devices with the correct certificate can join the network.

Provisioning database 267 can further include a third provisioning file for the electronic device having radio frequency details of the electronic device. The third file can further include information which includes parameters to communicate with the antenna of the electronic device, e.g., OpenAMIP information. OpenAMIP is an Internet Protocol (IP) that facilitates the exchange of information between an antenna controls and a satellite router. It allows the router to command the antenna and enables the use of Automatic Beam Switching (ABS) which transfers connectivity from one satellite beam to the next as the electronic device passes through multiple satellite footprints. In addition, OpenAMIP and ABS enable the electronic device to meet government regulations by commanding the antenna to mute the electronic device signal in no-transmit zones. The third file can further include a modem serial number and manufacturer's model type of the electronic device. The third provisioning file can further include configuration information about the electronic device's block up-converter (BUC) power level and information the electronic device's low-noise block down-converter. The third provisioning file can further include one or more passwords to be set by electronic device for electronic device management access, such as by a technician.

Provisioning database 267 can further include a fourth provisioning file having local area network (LAN) information for the electronic device that relates to the satellite modem Ethernet interfaces, virtual LANs (VLANs), and IP routing. The fourth file can further include an IP address of the electronic device.

Provisioning database 267 can further include a first commissioning file having information about the commissioning process. This file can contain values from a machine learning model that can be trained using results of commissioning tests, gathered from a plurality of electronic devices of a same or similar type. The tests can include measurements of cross-polarization discrimination (XPD), beam gain, beam side load level (SLL) measured in dB relative to the peak of the main beam, instantaneous bandwidth (IBW), P1dB and maximum power information. The commissioning file is pre-generated based on statistical analysis and machine learning based on historical provisioning and commissioning information of a plurality same, or similar, electronic devices. The file can contain an arbitrary number of key-value pairs. The providing the commissioning file enables the modem to get online in the network and pass data on the network.

The above files are example first provisioning and first commissioning files. Once installed, the electronic device can be powered on, preferably at a second location (e.g., end-use location), and the electronic device can access an activated user account to download second provisioning information that is based on the particular model of the electronic device and, optionally, a second location of the electronic device.

As described herein, the first provisioning and first commissioning information can be downloaded to an ASM 200 at a first location, such as a manufacturing facility. Second provisioning information can be downloaded to the ASM 200 when the ASM 200 is powered on at a second location, such as an end-use location, after the user account has been activated.

Server 250 can include server communication module 270. Server 250 can communicate with technician terminal(s) 290 to receive results of manufacturing tests and commissioning tests, and data collected during manufacturing tests for each antenna 200 or combiner 201. Server communications 270 can respond to an ASM 200 request for initiating a Transport Layer Security (TLS) connection between the ASM 200 and server 250, and negotiate the connection as described above for ASM 200.

Server 250 can also include ASM management software 275, a database of ASM identities of ASM's 200, a database of ASM configuration and performance information 260 for each ASM 200 having an identity in ASM identities 255, and processing hardware 280. Processing hardware 280 can include hardware as described below with reference to FIG. 7. Processing hardware can include one or more of a satellite modem, a cellular transceiver, a WiFi transceiver, routing hardware, and other communications hardware that support one or more communications standards. Database 260 can include manufacturing test results and data collected during manufacturing testing, and can include updates to software and configuration parameters of deployed devices, such as antennas 200 and combiners 201. Server 250 can further include provisioning and commissioning database 267, as described above. Machine learning server 265 can use ASM configuration and performance database 260 as input to generate one or more provisioning and commissioning values to be stored in provisioning and commissioning database 267.

ASM management software 275 receives periodic "check-ins" from each ASM 200 that is configured to "check-in" with server 250 periodically. In an embodiment, the check-in increment is one hour, but is configurable to any time period. During an ASM 200 check-in, an ASM sends a metrics package to the server 250. In an embodiment, the metrics data can be preceded by, or accompanied by, a header indicating, e.g., a serial number of the ASM and reconfigurable holographic antenna, a software version and an active partition running on the ASM, details of a file system on the ASM, and other data. In an embodiment, the metrics data can comprise a file. The ASM header includes a serial number of the ASM 200, a currently active partition indication including the currently active software version and configuration parameters of the steerable antenna. The metrics package can include power on self-test (POST) results, temperature and humidity of the environment where the ASM is installed, and temperature of each segment of the steerable antenna. The metrics package can further include file system information, such as a current file size of each file, list of files in a partition, and the like. ASM management 275 receives, decrypts, and stores the metrics package in ASM configuration and performance database 260. ASM management 275 then inspects ASM configuration and performance database 260 to determine: (1) whether there is a update to the ASM 200 software available, (2) whether there is a debug or diagnostic request pending for the ASM, (3) whether there are updated configuration parameters for the ASM 200 that can be installed, or (4) whether one or more configuration parameters have been manually optimized by a user, and the manual optimization resulted in poorer performance and should be reset to previous configuration parameters.

Software Updating

When ASM management 275 receives the metrics package from the ASM 200, ASM management 275 extracts the serial number of the ASM 200 and the software version of the currently active partition. ASM management 275 looks up, in ASM configuration and performance database 260, whether there is an updated version of software that is applicable to this particular ASM 200. If so, then ASM management 275, uses ASM 200's serial number to lookup, in ASM configuration and performance database 260, a number of times that this ASM 200 has previously attempted to previous install this particular version of updated software. If the previous attempts number is greater than zero, then ASM management 275 has determined that this ASM 200 has previously tried to install this update of software and rebooting to this updated version of software was unsuccessful on this ASM 200. Alternatively, or in addition, ASM management 275 can determine that the software installed on the currently active partition of this ASM 200 is outdated, and that the software installed in the other, non-active, partition is the same version as the updated software that the ASM management 275 proposes to tell the ASM 200 to install. If the number of retries (failed reboots with the new software) is less than a predetermined maximum number of times, e.g., three times, ASM management 275 will send a command to ASM 200 to request the updated software for installation. If the number or retries is the maximum number or more than the maximum number, then ASM management 275 can send a command to ASM 200 to stop requesting the updated software, and can further set a flag in ASM configuration and performance database 260 that this ASM 200 has not been able to successfully install this software update. In an embodiment, the ASM 200 can determine that it has tried, and failed, to reboot with the new software a predetermined number of times, and the ASM 200 can set itself to stop trying to download, install, or reboot to, the new software. A technician may access ASM configuration and performance database 260 via ASM management 275 to diagnose why the installation of the software update was unsuccessful.

Debug or Diagnostic

A technician, who may have been in communication with a user of the steerable antenna 200, can access server 250 ASM performance and configuration database 260 via ASM management 275, using the serial number of the ASM 200, to determine an action to help resolve a problem for the user. In an embodiment, the technician can instruct ASM management 275 to send a command to ASM 200 to enter a debugging mode than may have a more verbose logging of specific information that may help the technician resolve the problem. ASM management 275 accesses the ASM configuration and performance database 260 to retrieve the debugging command, and transmits the command to ASM 200 to execute. In response, ASM 200 will execute the command, perform the requested logging, and ASM management 275 will receive and store the logs generated by the debug command in ASM configuration and performance database 260, and the debugging mode will end. The technician can retrieve and inspect the logs, and further determine how to resolve the problem. In an embodiment, the technician can inform the server 250 that on next check-in by the ASM 200, that server 250 can tell the ASM 200 to request a "hot-fix" or "patch" intended to resolve the problem. ASM management 275 can send the hot-fix or patch to ASM configuration and performance database 260 for storage. ASM management 275 can either store the hot-fix or patch in association with the serial number of the ASM 200 to be patched, or store the hot-fix or patch in a dedicated storage area and store a reference to the hot-fix or patch in association with the serial number of the ASM 200.

Update Parameters

When ASM management 275 receives the metrics package from the ASM 200, ASM management 275 extracts the serial number of the ASM 200 and the currently active configuration parameters for the ASM 200. The package received from ASM 200 can contain headers and data in any format agreed upon between the ASM 200 and server 250.

In an embodiment, a header in the package contains a serial number uniquely identifying the ASM 200 and associated reconfigurable holographic antenna. ASM management 275 looks up, in ASM configuration and performance database 260, whether there is an updated version of one or more configuration parameters that is applicable to this particular ASM 200. If so, then ASM management 275 sends a command to ASM 200 to request the updated configuration parameters. When ASM management 275 receives the request from ASM 200, ASM management 275 can generate a package with the command to install the updated configuration parameters and data containing the updated configuration parameters.

Reset Manually Optimized Parameters

Some or all of the configuration parameters of ASM 200 can be manually optimized through ASM 200 self-optimization software. It is possible that self-optimization may change one or more configuration parameters, but that the result may be that the ASM 200 performance is lower than before the manual self-optimization process on the ASM 200. When ASM management 275 receives a periodic check-in package from ASM 200, ASM management 275 can extract the serial number of the ASM 200, performance metrics, and configuration parameters from the package, and use the serial number to look up pervious configuration parameters and performance metrics for this ASM 200 that are stored in ASM configuration and performance database 260. If ASM management 275 determines that performance of ASM 200 was better with the previously stored configuration parameters, or with factory configuration parameters installed in the ASM 200 when it was shipped, then ASM management 275 can send a package with a command to install new configuration parameters that are included in the package with the command. Alternatively, ASM management 275 can send a command to the ASM 200 to request reset of configuration parameters that were changed due to manual optimization.

Server 250 can also include a machine learning module 265. Machine learning module 265 can receive criteria, e.g., from a technician via ASM management 275, with which to perform machine learning upon selected data stored in the ASM configuration and performance database 260. For example, a technician or engineer may have received notice from one or more users that the reception in a certain geo-location is poor at certain times of day. Machine learning 265 can receive a request to perform machine learning upon data selected from ASM configuration and performance 260 that correlates performance of a steerable antenna to a specified geo-location and time of day. This may help locate regions with poor satellite coverage at certain times of day, and help define the bounds of the region. As a second example, machine learning 265 can receive a request to correlate manually self-optimized configurations with performance to determine whether a self-optimization algorithm is performing its intended function of improving performance. A request can include selection criteria for devices meeting specified performance or configuration criteria, and the request can include correlation criteria with which to perform machine learning. The request can further include a minimum correlation threshold for determining that the selected records meet or exceed the specified correlation threshold. In an embodiment, the selection and correlation criteria can further include a proposed improvement to deploy should the minimum correlation threshold be met or exceeded. Alternatively, or in addition, the results of any machine learning task can be reported to an appropriate entity, such as engineer, manufacturing, or quality control, regardless of whether the minimum correlation threshold was met.

Figure 3:
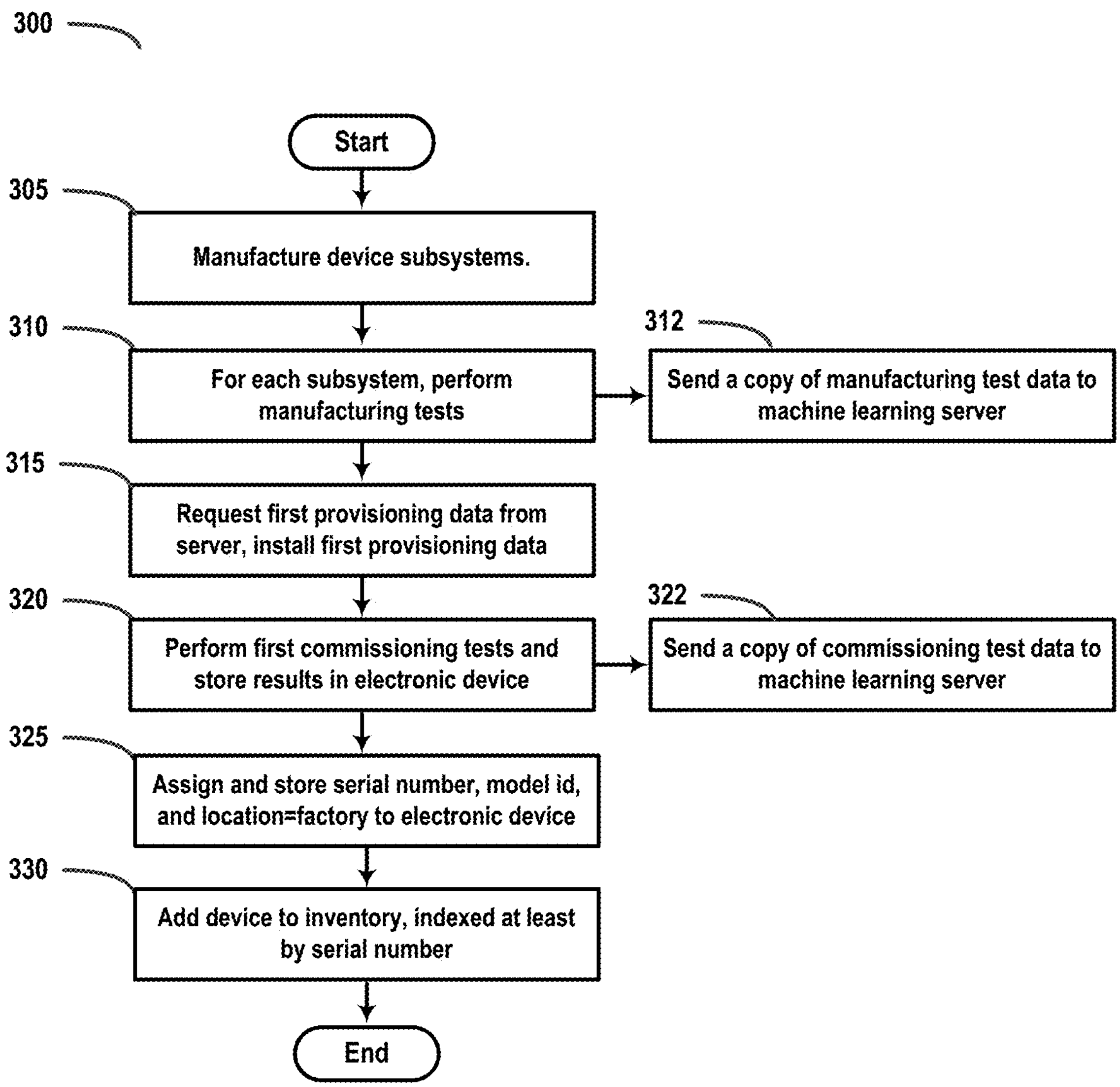
FIG. 3 illustrates a method that can automatically provision and commission an electronic device with first provisioning and commissioning information, at a first location, that is sufficient for the electronic device to connect to a network and a server, according to an embodiment.

FIG. 3 illustrates a method 300 that can automatically provision and commission an electronic device 200 (such as a satellite modem with steering control module and steerable holographic satellite antenna) with first provisioning and first commissioning information, at a first location, that is sufficient for the electronic device 200 to connect to a network 130 and a server 250, according to an embodiment.

In operation 305, a manufacturer can manufacture one or more device subsystems that form a part of an electronic device 200, such as a satellite modem coupled to an antenna subsystem module 200 (ASM) having a satellite modem and reconfigurable holographic satellite antenna.

In operation 310, for each subsystem of the electronic device 200, one or more manufacturing and/or commissioning tests may be performed that generate test data for the subsystem. In an embodiment, commissioning tests may only be performed on a completed device. Different types of electronic devices 200 will have different manufacturing tests, at different stages of manufacturing subsystems that make up the entire electronic device 200.

In operation 312, a copy of the manufacturing test data stored in ASM configuration and performance database 260 and is transmitted to a machine learning server, e.g., server 250 or 265). Machine learning server will train one or more models to generate first provisioning information. In an embodiment, machine learning models are trained using manufacturing test results for a plurality of models of electronic device that are sufficiently similar that a single value for a provisioning parameter to be able to be used for each of the plurality of electronic devices to connect to a network 130 of the type for which the electronic device 200 is designed, at a second location (e.g., intended use location) for the electronic device 200.

In operation 315, first provisioning information for the electronic device 200 is requested from a server 250, and the first provisioning information is installed in the electronic device 200.

In operation 320, one or more first commissioning tests are performed. Commissioning tests determine whether the electronic device 200, or one of its subsystems, perform to a specified value range one or more performance specifications for the electronic device 200. Each performance value resulting from a commissioning test is recorded with respect to its value range.

In operation 322, a copy of the commissioning test results is transmitted to a machine learning server, e.g., server 250. The machine learning server will train one or more models to generate first commissioning information. In an embodiment, machine learning models are trained using manufacturing commissioning test results for a plurality of models of electronic device that are sufficiently similar to each other that a single value for a commissioning parameter is able to be used for each of the plurality of electronic devices to be able to connect to a network 130 of the type for which the electronic device 200 is designed, at a second location (e.g., intended use location) for the electronic device 200.

In operation 325, the electronic device 200 is assigned a serial number, a model identifier, and a location identifier which are stored at a server 250 and within the electronic device 200, e.g., in configuration data 215A. The location identifier represents a first location. In an embodiment, location identifier represents a location at which the electronic device 200 was manufactured.

In operation 330, the electronic device is added to an inventory database in a server 250, indexed by a least the serial number of the electronic device 200. In an embodiment, the electronic device is further indexed by a model identifier of the electronic device, or one or more specification values of the device. In such an embodiment, a machine learning server can use the one or more indices to retrieve matching electronic device manufacturing records to facilitate machine learning for first provisioning and first commission information.

Figure 4:
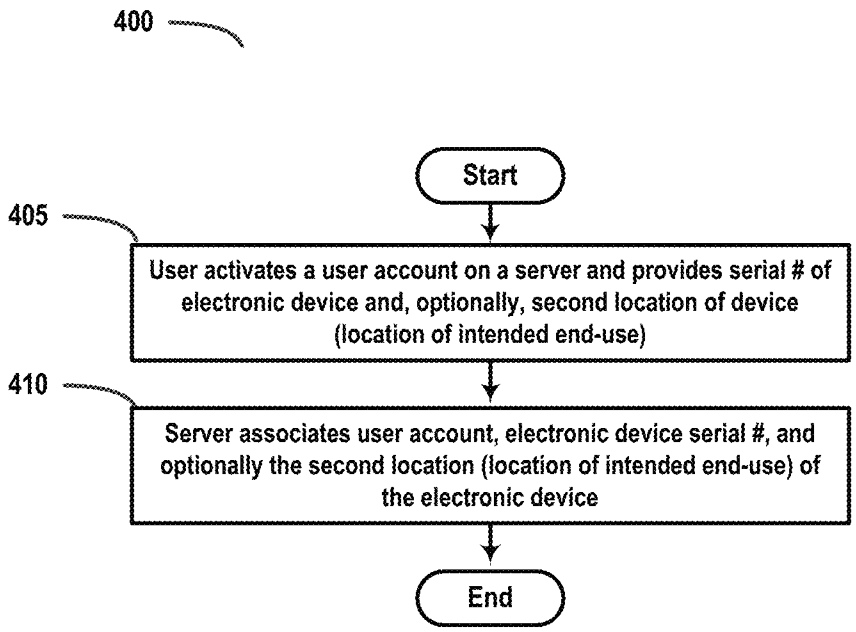
FIG. 4 illustrates a method of activating a user account that can perform automatic provisioning of an electronic device with second provisioning information at a second location, according to one embodiment.

FIG. 4 illustrates a method 400 of activating a user account that can perform automatic provisioning and commissioning of an electronic device 200 at first location and provide the electronic device 200 with second provisioning information at a second location, according to one embodiment. User can use a user terminal 291 to activate the user account, as described above with reference to FIG. 1. In an embodiment, activating the user account is a separate process from automatically provisioning and commissioning the electronic device 200.

In operation 405, a user creates a login account on a user account activation server. In an embodiment, user account activation server can be a server 250 as described above with reference to FIG. 1 and FIG. 2B. The user account can be created in a manner as is known in the art, with additional details as described herein. In an embodiment, the user provides a serial number of an electronic device 200 that is to be associated with the user account. In an embodiment, the user can also provide, if known, one or more end-use locations at which the user will operate the electronic device 200. These locations are each "a second location" (as distinguished from a first location, which is typically a manufacturing location) as referred to throughout this application. User may select from subscription services, such as one or more carriers at which the user will operate the electronic device, or an enumeration of one or more satellites that a user may select from for communications services with the electronic device. Selection of one or more satellites that a user may select for communications with the electronic device may be determined by a geo-location in which the user may use the electronic device. Subscription services are by way of example, and not limitation. In an embodiment, the user can select an option to add the geo-location of the electronic device to the one or more locations associated with the electronic device in the user account at each time the electronic device is powered on.

In operation 410, the user account server 250 associates the user account with the one or more selected subscription services, the serial number of the electronic device 200 provided by the user, and optionally the one or more geo-locations ("second location") where the user intends to operate the electronic device. The selected geo-locations may be supplemented, or replaced, by a location of the electronic device at the time that the user first powers on the electronic device. In an embodiment, the user can select an option to automatically add any location from which the electronic device is powered on as a second location for the electronic device. The user saves the account activation information described above, in addition to well-known information user account information such as a user contact, user payment method, user billing address, et al.

Figure 5:
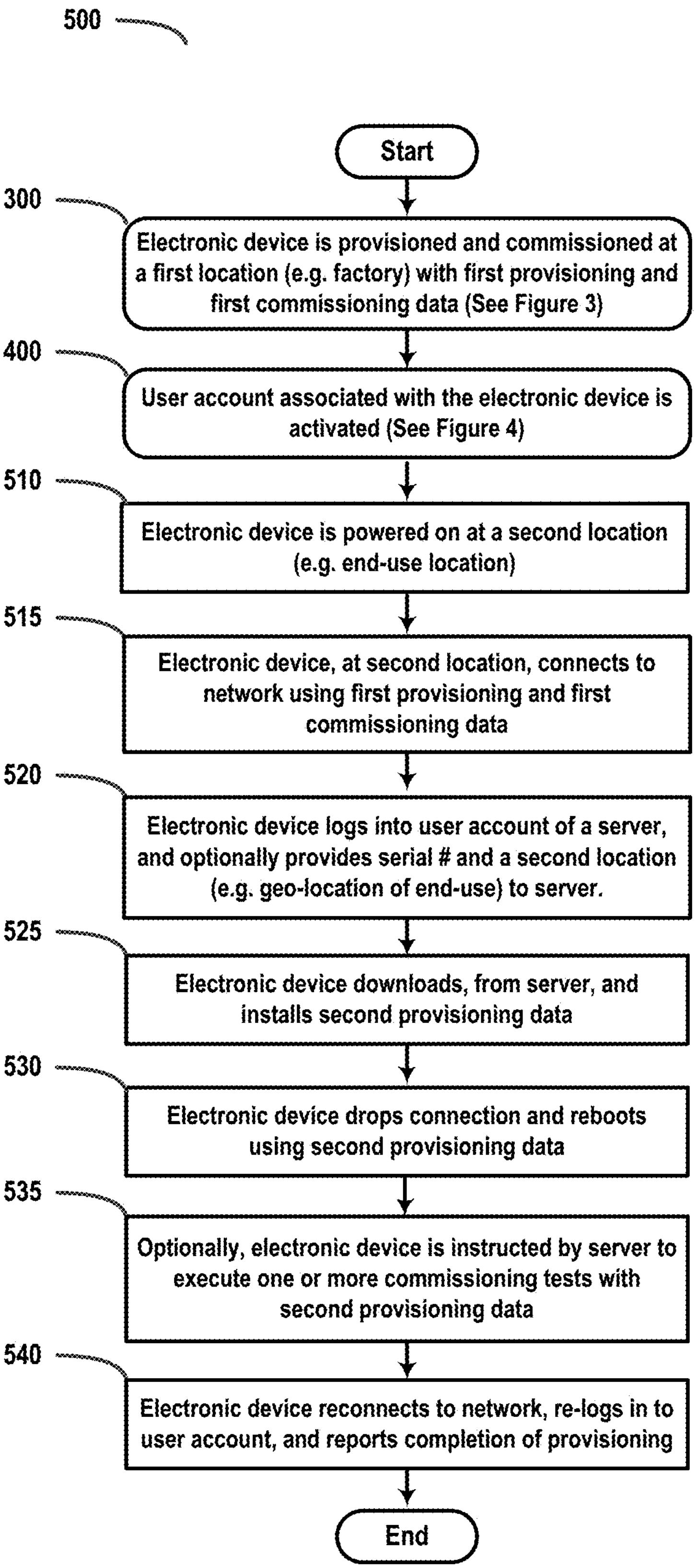
FIG. 5 illustrates a method of automatically provisioning an electronic device with first provisioning and commissioning information at a first location, and with second provisioning information at a second location, according to one embodiment.

FIG. 5 illustrates a method 500 of automatically provisioning an electronic device 200 with first provisioning and first commissioning information at a first location, and with second provisioning information at a second location, according to one embodiment.

In operation 300, the electronic device is provided with first provisioning information and first commissioning information, as described above with reference to method 300 of FIG. 3.

In operation 400, a user account is associated with the electronic device, when the electronic device is powered on and the user account has been previously activated. Operation 400 is described in detail, above, with reference to FIG. 4.

In operation 510, electronic device is powered on at a second location (e.g., end-use location). As described above, a user account may be associated with more than one second location (end-use location). When the device is powered on, any location in the user account's one or more locations is a second location.

In operation 515, the electronic device, at the second location, connects to a network using an Internet Protocol (IP address), or other network address, and credentials that are stored in the electronic device as a part of the first provisioning information and/or first commissioning information.

In operation 520, the electronic device logs into the activated user account on a user account server. In an embodiment, the electronic device provides the serial number of the device by looking up the serial number the device's own storage, which may be a part of first provisioning information. Electronic device then transmits its serial number to the user account as a part of a first power-on process for the electronic device at the second location. In an embodiment, the electronic device determines its own global positioning system (GPS) coordinate, cellular tower triangulation location, or other indication of its own current location and transmits the current location for the user account server to use as a "second location" (i.e. end-use location).

In operation 525, the electronic device downloads, from the user account server, or a server to which the electronic device is redirected, second provisioning information, based at least in part upon the serial number of the electronic device and the second location. In an embodiment, second provisioning information can be based upon the particular services that a user has subscribed to, as indicated in the user account. For example, a user may indicate a particular second location (end-use location) but may not have subscribed to all available services in the second location. Thus, second provisioning information may be limited to those services to which the user has subscribed.

In operation 530, the electronic device logs off of the user account server and drops the communication connection to the user account server. The electronic device then reboots to activate the second provisioning information on the electronic device. In an embodiment, if the first provisioning information and first commissioning information is a part of the a currently active partition, e.g., partition #1, of the electronic device storage, then the electronic device stores the second provisioning information in partition #2, and the device reboots to partition #2. If the reboot fails, the electronic device reboots again, this time back to partition #1.

In operation 535, optionally, the electronic device is instructed to execute one or more commissioning tests using the newly installed second provisioning information. Server may instruct the electronic device to download the commissioning test(s), then execute the commissioning tests to generate second commissioning information. Electronic device can transmit the second commissioning information to the server. In an embodiment, the electronic device can store the second commissioning information in a storage partition with the second provisioning data.

In operation 540, electronic device reconnects to the network using network specific credentials stored in the electronic device during first provisioning at a first location, and reports completion of installation of the second provisioning information. Method 500 ends.

Figure 6:
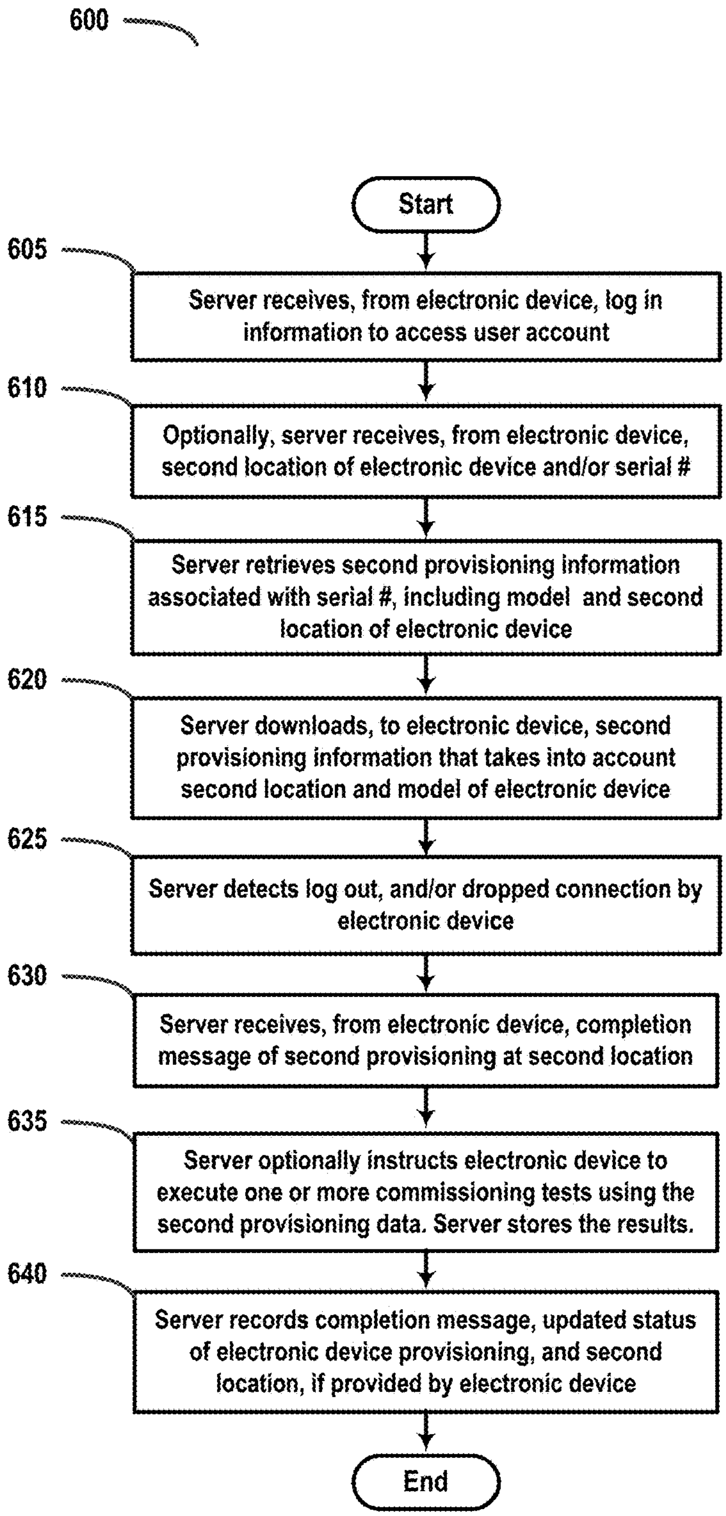
FIG. 6 illustrates a method of a server providing an electronic device with first provisioning and commissioning information at a first location, and providing second provisioning information at a second location, according to one embodiment.

FIG. 6 illustrates a method 600 of a server 250 providing an electronic device 200 with second provisioning information at a second location, according to one embodiment. The second location can be an end-use location. The second location may be stored in association with a user account. In an embodiment, the electronic device 200 can provide its current geo-location as a second location (end-use location).

In operation 605, the server receives, from an electronic device 200, log in information to access a user account. In an embodiment, the login information may be provided by a user and stored in a storage of the electronic device, so that the electronic device 200 can automatically log in to the user account.

In operation 610, optionally, the server receives from the electronic device an indication of a current location of the electronic device. Electronic device 200 can determine its own current location using triangulation of cell towers or a GPS location determined by the electronic device, or other method. Server can receive the current location information from the electronic device and use the current location of the electronic device as a "second location" (e.g., end-use location) in lieu of one or more end-use locations that are optionally specified within the user account.

In operation 615, server retrieves second provisioning information associated with a serial number of the electronic device, including a model of the electronic device. The second provisioning information can be further dependent upon the second location of the electronic device obtained in operation 605 or 610, above.

In operation 620, server instructs the electronic device to download the second provisioning information from the server.

In operation 625, server detects that electronic device logs out, and/or drops a connection with the server. Server monitors for electronic device to report success or failure of the installation and activation of the second provisioning information.

In operation 630, the server receives from electronic device an indication of completion of installation and activation of the second provisioning information.

In operation 635, the server optionally instructs the electronic device to download and execute one or more commissioning tests. Commissioning tests can include a steering and pointing test, a cross-polarization discrimination (XPD) test, side lobe level (SLL) test, an instantaneous bandwidth (IBW) test, a P1dB test, or a combination of these, or other commissioning tests. Server can receive, from the electronic device, results of the one or more commissioning tests and generate second commissioning information for the electronic device to download and store.

In operation 640, server records the completion message, updated status of the electronic device provisioning, and the second location, if the location was provided to the server by the electronic device. Method 600 ends.

Figure 7:
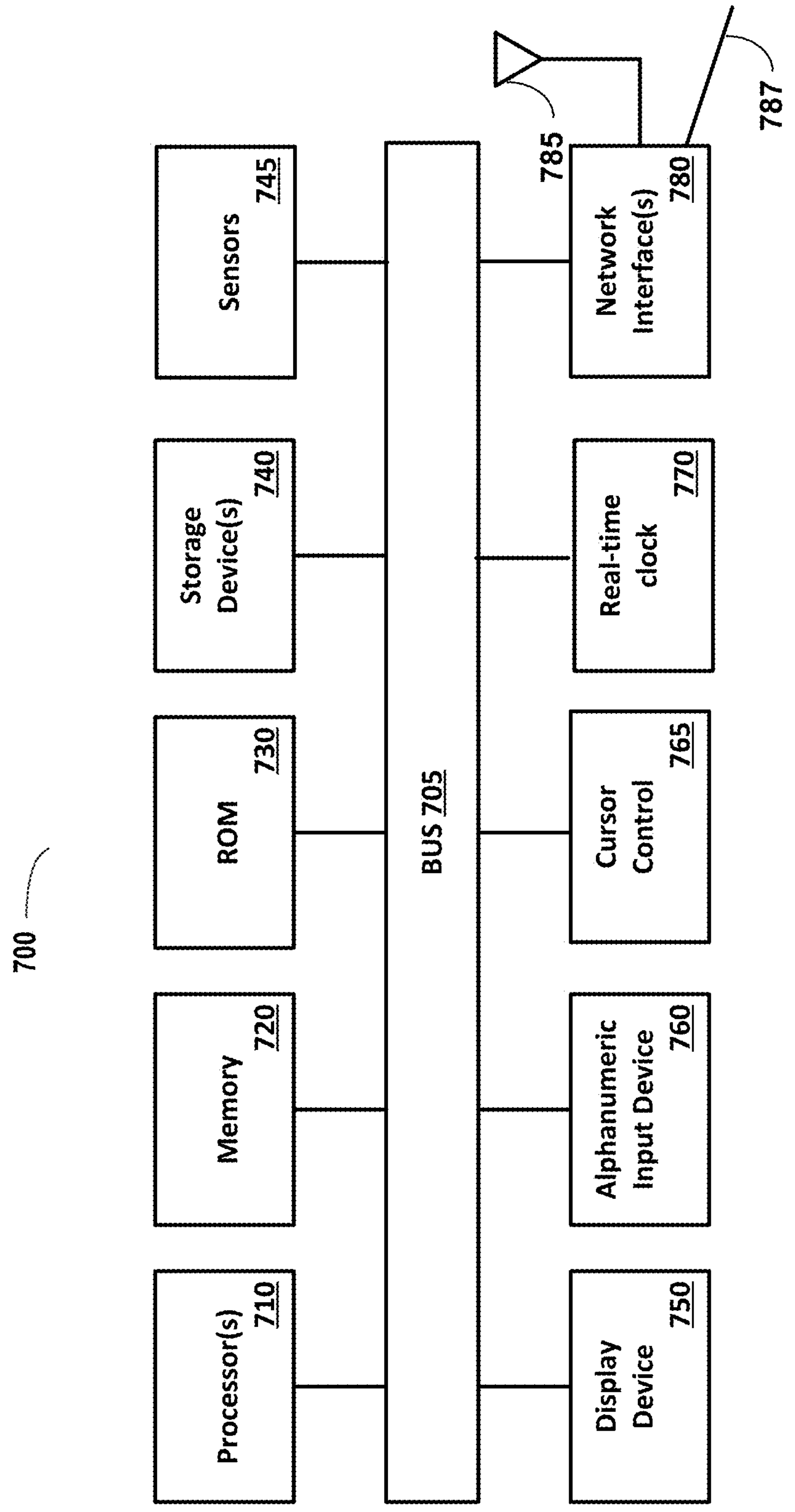
FIG. 7 illustrates an exemplary computing system for implementing the embodiments described herein, according to an embodiment.

FIG. 7 is a block diagram of one embodiment of a computing system 700. Computing system 700 can be used to implement the above-described computer system for a technician, a combiner 201, an antenna subsystem module 200, or a server 250. Not all of the below-described components are required for every embodiment. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components.

Computing system 700 includes bus 705 or other communication device to communicate information, and processor 710 coupled to bus 705 that may process information. While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710. Memory 720, ROM 730, and/or storage devices 740 can be programmed with executable instructions that, when executed by processor(s) 710 perform any of the above-described operations and functionality.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 can also include sensors 745, coupled to bus 705. Sensors 745 can include a GPS receiver, a three-axis compass, a 3-axis accelerometer, a 3-axis gyro, a 3-axis magnetometer, and other sensors to provide location and orientation information to processor(s) 710. An ASM 200 may require some or all of sensors 745. ASM 200 may have more, or fewer, sensors than those described for computing system 700.

Computing system 700 may also be coupled via bus 705 to display device 750, such as a light-emitting diode display (LED), touch screen display, or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below. Real-time clock can be used to implement timers in some embodiments.

Computing system 700 further may include one or more network interface(s) 780 to provide access to a network, such as a local area network. Network interface(s) 780 may include, for example, a wireless network interface having antenna 785, which may represent one or more antennas. Computing system 700 can include multiple wireless network interfaces such as a combination of Wi-Fi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable. Network interfaces may include connectivity to a satellite communication system.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported, such as ground-to-satellite communications. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A server comprising:
a network interface;
a processor; and
a memory coupled to the processor to store instructions, that when executed by the processor, cause the processor to perform operations for providing second provisioning information to an electronic device powered on at a second location, wherein the electronic device was previously provisioned with first provisioning information at a first location, different from the second location, the second provisioning provided over a network, using the network interface, the operations including:
receiving, from the electronic device, login information to a user account on the server;
downloading, to the electronic device, second provisioning information that takes into account at least the second location and a manufacturer and model of the electronic device; and
receiving, from the electronic device, an indication of successful installation of the second provisioning information.

2. The server of claim 1, the operations further comprising:
receiving, from the electronic device, a serial number of the electronic device and an indication of a geo-location of the second location; and
retrieving, using the serial number, a model identifier of the electronic device, and retrieving the second provisioning information that is based at least in part upon the model identifier and second location.

3. The server of claim 2, the operations further comprising:
after the electronic device has downloaded and installed the second provisioning information, instructing the electronic device to perform one or more commissioning tests that generate second commissioning information; and
storing the second commissioning information in association with the serial number of the electronic device.

4. The server of claim 3, wherein the one or more commissioning test comprises one or more of: a steering and pointing test, a cross-polarization discrimination (XPD) test, a side lobe level (SLL) test, a P1dB test, and a test to determine maximum power of the electronic device operating as a steerable antenna.

5. The server of claim 2, wherein the operations further comprise activating the user account associated with the electronic device to enable performance of automatic provisioning of the electronic device with the second provisioning information at the second location.

6. The server of claim 1, wherein the first provisioning information includes values that are predetermined for a plurality of different electronic devices and the second provisioning information is particular to one or more aspects of the electronic device.

7. The server of claim 1, wherein the electronic device comprises one or more of a satellite modem or a cellular transceiver.

8. The server of claim 7, wherein the satellite modem is incorporated with a reconfigurable satellite antenna.

9. The server of claim 1, wherein the first location comprises a manufacturing location and the second location comprises an end-use location for the electronic device.

10. The server of claim 1, wherein the first provisioning information configures the electronic device with an assumed hardware profile that is sufficient for the electronic device to establish communication with a network.

11. The server of claim 1, wherein the second provisioning information configures the electronic device with modifications to the first provisioning information based upon an actual hardware profile for the electronic device, and the second provisioning information modifies one or more configuration parameters of the electronic device related to the second location.

12. A computer-implemented method for automatically provisioning an electronic device using a server, wherein the electronic device was previously provisioned with first provisioning information at a first location, different from a second location, comprising:
receiving, from the electronic device, login information to a user account on the server;
downloading, to the electronic device, second provisioning information that takes into account at least the second location and a manufacturer and model of the electronic device, the second provisioning information provided over a network and using the network interface; and receiving, from the electronic device, an indication of successful installation of the second provisioning information.

13. The computer-implemented method of claim 12, further comprising:

receiving, from the electronic device, a serial number of the electronic device and an indication of a geolocation of the second location; and retrieving, using the serial number, a model identifier of the electronic device, and retrieving the second provisioning information that is based at least in part upon the model identifier and second location.

14. The computer-implemented method of claim 13, further comprising:

after the electronic device has downloaded and installed the second provisioning information, instructing the electronic device to perform one or more commissioning tests that generate second commissioning information; and storing the second commissioning information in association with the serial number of the electronic device.

15. The computer-implemented method of claim 14, wherein the one or more commissioning test comprises one or more of: a steering and pointing test, a cross-polarization discrimination (XPD) test, a side lobe level (SLL) test, a P1dB test, and a test to determine maximum power of the electronic device operating as a steerable antenna.

16. The computer-implemented method of claim 13, further comprising activating the user account associated with the electronic device to enable performance of automatic provisioning of the electronic device with the second provisioning information at the second location.

17. The computer-implemented method of claim 12, wherein the first provisioning information includes values that are predetermined for a plurality of different electronic devices and the second provisioning information is particular to one or more aspects of the electronic device.

18. The computer-implemented method of claim 12, wherein the electronic device comprises one or more of a satellite modem or a cellular transceiver.

19. The computer-implemented method of claim 18, wherein the satellite modem is incorporated with a reconfigurable satellite antenna.

20. A non-transitory machine-readable medium having instructions stored therein, which when executed by a processor, cause the processor to perform operations for automatically provisioning an electronic device using a server, wherein the electronic device was previously provisioned with first provisioning information at a first location, different from a second location, the operations comprising:

receiving, from the electronic device, login information to a user account on the server;

downloading, to the electronic device, second provisioning information that takes into account at least the second location and a manufacturer and model of the electronic device, the second provisioning information provided over a network and using the network interface; and receiving, from the electronic device, an indication of successful installation of the second provisioning information.

* * * * *